US012185047B2

(12) United States Patent
Wu et al.

(10) Patent No.: US 12,185,047 B2
(45) Date of Patent: Dec. 31, 2024

(54) WEARABLE COMPONENT, EAR TIP, AND METHOD OF MANUFACTURING A WEARABLE COMPONENT

(71) Applicant: Advanced Semiconductor Engineering, Inc., Kaohsiung (TW)

(72) Inventors: Chang Yi Wu, Kaohsiung (TW); Hung Yi Lin, Kaohsiung (TW); Jenchun Chen, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 179 days.

(21) Appl. No.: 17/560,179

(22) Filed: Dec. 22, 2021

(65) Prior Publication Data

US 2023/0199362 A1 Jun. 22, 2023

(51) Int. Cl.
*H04R 1/10* (2006.01)

(52) U.S. Cl.
CPC ......... *H04R 1/1016* (2013.01); *H04R 1/1058* (2013.01); *H04R 1/1091* (2013.01)

(58) Field of Classification Search
CPC ...... H04R 1/10; H04R 1/1016; H04R 25/652; H04R 2225/025; A61B 5/6801; A61B 5/6802; A61B 5/6817
See application file for complete search history.

(56) References Cited

U.S. PATENT DOCUMENTS

| | | | | |
|---|---|---|---|---|
| 8,788,002 | B2 * | 7/2014 | LeBoeuf | A61B 5/11 600/310 |
| 8,888,701 | B2 * | 11/2014 | LeBoeuf | A61B 5/6803 600/323 |
| 9,571,913 | B2 * | 2/2017 | Masaki | H04R 1/1083 |
| 9,794,653 | B2 * | 10/2017 | Aumer | G08B 21/18 |
| 10,015,582 | B2 * | 7/2018 | Wagner | A61B 5/6803 |
| 10,076,253 | B2 * | 9/2018 | Just | A61B 5/721 |
| 10,271,124 | B2 * | 4/2019 | Lin | H04R 1/2849 |
| 10,575,777 | B2 * | 3/2020 | Ayers | G06F 3/013 |
| 10,827,249 | B1 * | 11/2020 | Pine | H04R 1/1041 |
| 10,835,145 | B1 * | 11/2020 | Prevoir | A61B 5/6817 |
| 10,856,812 | B2 * | 12/2020 | Walter | A61B 5/14551 |
| 10,905,337 | B2 * | 2/2021 | Tran | H04R 25/659 |
| 10,911,867 | B2 * | 2/2021 | Pedersen | H04R 1/40 |
| 11,115,764 | B2 * | 9/2021 | Silberzahn | H04R 25/609 |
| 11,344,256 | B2 * | 5/2022 | Kirszenblat | A61B 5/1102 |
| 11,418,899 | B2 * | 8/2022 | Nielsen | H04R 25/609 |
| 11,463,827 | B2 * | 10/2022 | Sacha | A61B 5/398 |
| 11,523,202 | B2 * | 12/2022 | Au | H04R 25/609 |

(Continued)

FOREIGN PATENT DOCUMENTS

| | | | |
|---|---|---|---|
| DE | 3936062 | A1 * | 5/1991 |
| WO | WO-2022125434 | A1 * | 6/2022 |

(Continued)

*Primary Examiner* — Ryan Robinson
(74) *Attorney, Agent, or Firm* — FOLEY & LARDNER LLP

(57) ABSTRACT

The present disclosure provides a wearable component. The wearable component includes a first carrier and a first electronic component at least partially embedded within the first carrier. The first carrier and the first electronic component define a space configured for audio transmission. An ear tip and a method of manufacturing a wearable component are also provided.

19 Claims, 18 Drawing Sheets

(56) References Cited

U.S. PATENT DOCUMENTS

| | | | | | |
|---|---|---|---|---|---|
| 11,523,208 | B2 * | 12/2022 | Huang | H04R 1/1016 | |
| 2014/0319734 | A1 * | 10/2014 | Voit | H04R 25/652 | 264/129 |
| 2015/0092952 | A1 * | 4/2015 | Sudo | H04R 1/2869 | 381/71.6 |
| 2016/0317049 | A1 * | 11/2016 | LeBoeuf | G06Q 30/0241 | |
| 2017/0020391 | A1 * | 1/2017 | Flitsch | G16H 40/67 | |
| 2019/0192077 | A1 * | 6/2019 | Kaiser | G06F 3/015 | |
| 2021/0093255 | A1 * | 4/2021 | Mueller | A61B 5/6815 | |
| 2021/0100508 | A1 * | 4/2021 | Vos | H04R 25/603 | |
| 2021/0307690 | A1 * | 10/2021 | Robertson | A61B 5/0024 | |
| 2022/0015703 | A1 * | 1/2022 | Mirov | A61B 5/374 | |
| 2022/0218281 | A1 * | 7/2022 | Petersen | H04R 25/609 | |
| 2023/0094165 | A1 * | 3/2023 | Barlow | A61B 5/02416 | 600/310 |
| 2023/0108893 | A1 * | 4/2023 | Glenn | H04R 25/60 | 381/324 |
| 2023/0179901 | A1 * | 6/2023 | O'Callaghan | H04R 25/48 | 381/311 |

FOREIGN PATENT DOCUMENTS

| | | | |
|---|---|---|---|
| WO | WO-2022248628 | A1 * | 12/2022 |
| WO | WO-2023016504 | A1 * | 2/2023 |

* cited by examiner

WEARABLE COMPONENT, EAR TIP, AND METHOD OF MANUFACTURING A WEARABLE COMPONENT

BACKGROUND

1. Technical Field

The present disclosure relates to a wearable component, an ear tip, and a method of manufacturing a wearable component.

2. Description of the Related Art

Numerous methods have been developed to obtain information or signals reflecting physical activity and/or health through non-invasive subject measurements. For example, components or packages (such as system in package (SiP)) may be integrated into wearable devices to achieve the desired sensing ability. However, as more components are required to be integrated into wearable devices, physical considerations (for example, size and weight) can present challenges.

SUMMARY

In some embodiments, a wearable component includes a first carrier and a first electronic component at least partially embedded within the first carrier. The first carrier and the first electronic component define a space configured for audio transmission.

In some embodiments, an ear tip includes a first carrier and a first electronic component at least partially embedded within the first carrier. The ear tip also includes an electrical connection element exposed from the first carrier and configured to be removable with respect to the first electronic component.

In some embodiments, a method of manufacturing a wearable component includes providing an electronic component and forming a first carrier at least partially covering the electronic component and exposing a surface of the electronic component. The electronic component and the first carrier define a space configured for audio transmission.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
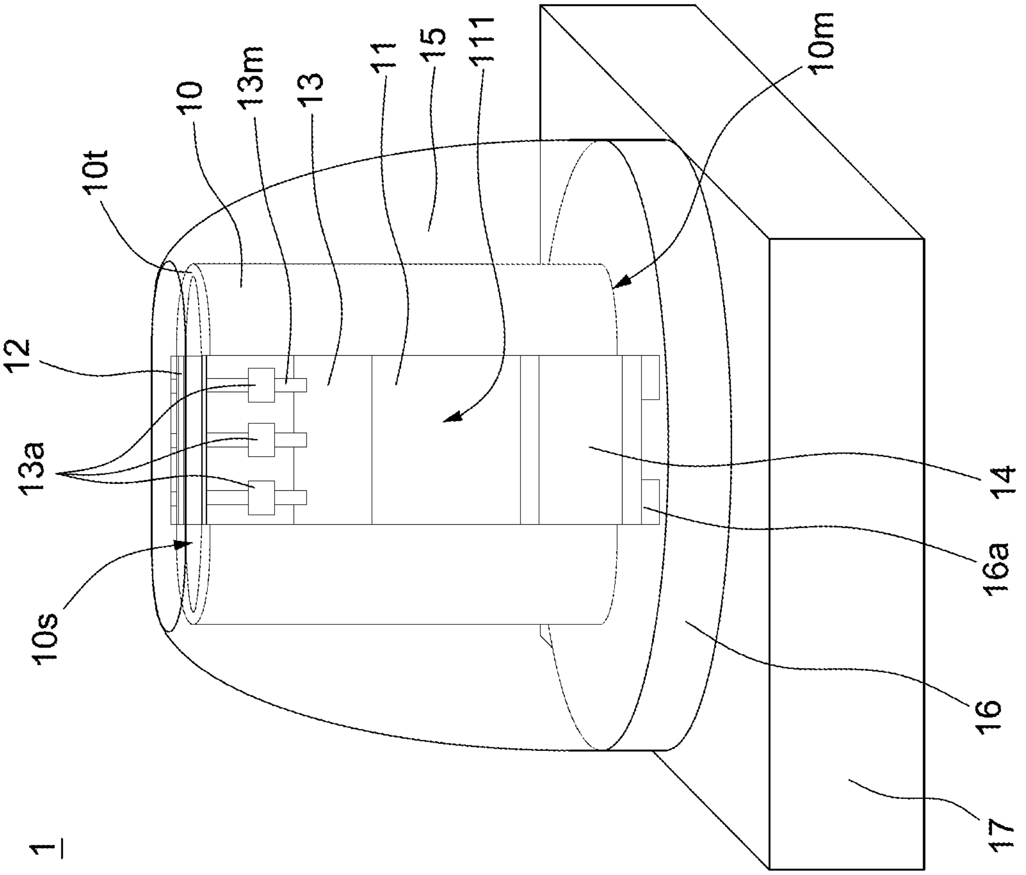
FIG. 1A illustrates a perspective view of a wearable component in accordance with some embodiments of the present disclosure.

The following disclosure provides for many different embodiments, or examples, for implementing different features of the provided subject matter. Specific examples of components and arrangements are described as follows to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

The following description involves a wearable component and a method of manufacturing a wearable component.

Figure 1B:
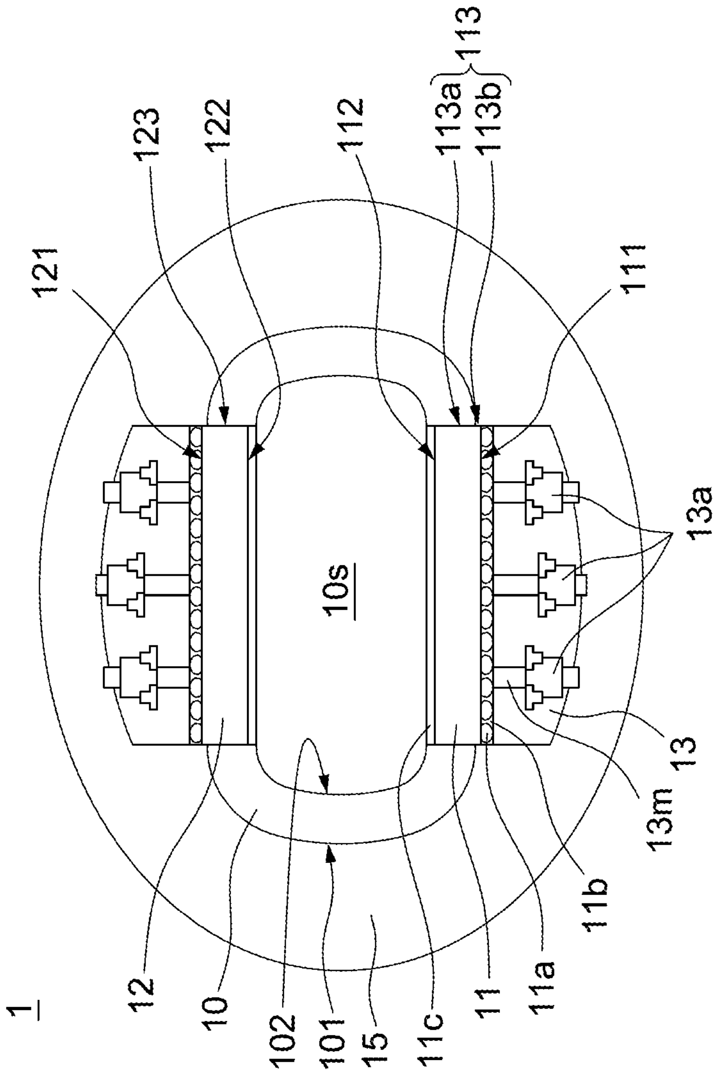
FIG. 1B illustrates a top view of a wearable component in accordance with some embodiments of the present disclosure.
Figure 1C:
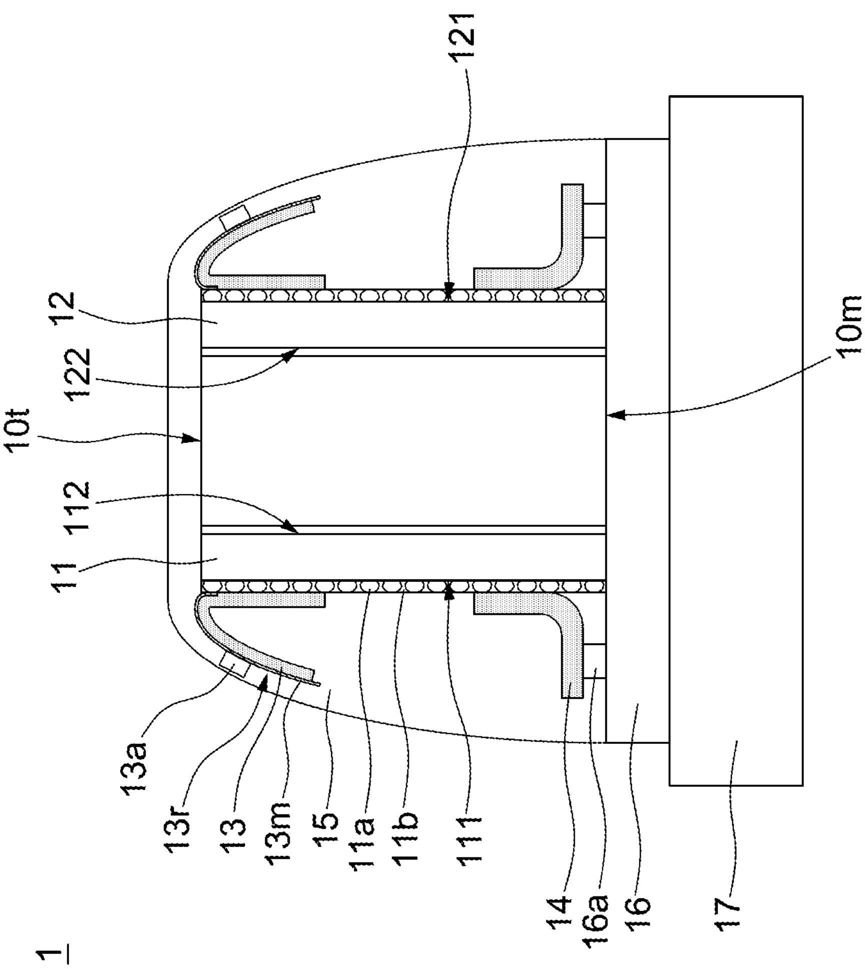
FIG. 1C illustrates a cross-sectional view of a wearable component in accordance with some embodiments of the present disclosure.

FIG. 1A illustrates a perspective view of a wearable component 1 in accordance with some embodiments of the present disclosure. FIG. 1B and FIG. 1C illustrate a top view and a cross-sectional view, respectively, of the wearable component 1 in accordance with some embodiments of the present disclosure.

In some embodiments, the wearable component 1 may include an ear tip of an earpiece. In some embodiments, the wearable component 1 may be a piece of equipment that transmits audio signals. In some embodiments, the wearable component 1 may be used in combination with a detection device (such as a sensor), an electronic device (such as a signal processing device) and/or other corresponding external devices for further processing acquired signals. Application or usage of the wearable component 1 in the figures is for illustrative purposes only, and not intended to limit the present disclosure.

Referring to FIGS. 1A, 1B, and 1C, the wearable component 1 may include a carrier 10, electronic components 11, 12, flexible connection elements 13, 14, one or more sensing elements 13*a*, another carrier 15, a connector 16, and an electronic device 17.

In some embodiments, the carrier 10 may have a top side 10*t* and a bottom side 10*m* opposite to the top side 10*t*. In some embodiments, when the wearable component 1 is worn by a user, the top side 10*t* of the carrier 10 sits more deeply into (or extends further into) the user's ear canal than does the bottom side 10*m*. In some embodiments, the carrier 10 may be or include, rubber, such as thermoset rubber or hard rubber, or other hard materials. In some embodiments, the carrier 10 may be or include, silicon (Si), glass or other suitable materials.

In some embodiments, the electronic component 11 and the electronic component 12 may be integrated into the carrier 10. For example, as shown in FIG. 1B, the electronic component 11 and the electronic component 12 may be partially embedded within the carrier 10. For example, the electronic component 11 and the electronic component 12 may be partially surrounded by the carrier 10.

In some embodiments, the carrier 10, the electronic component 11, and the electronic component 12 may define a space 10*s*. In some embodiments, the space (or a sound hole or a sound post) 10*s* may be configured for audio transmission.

Specifically, as shown in FIG. 1B, the carrier 10 may have an outer surface 101 facing away from the space 10*s* and an inner surface 102 facing the space 10*s*. A part of the carrier 10 (e.g., the inner surface 102) may be or may constitute a part of a sidewall of the space 10*s*.

Still referring to FIG. 1B, the electronic component 11 may include a surface 111, a surface 112 opposite to the surface 111, and a lateral surface 113 extending between the surface 111 and the surface 112. In some embodiments, the surface 111 may include an active surface and the surface 112 may include a backside surface. In some embodiments, the lateral surface 113 may be substantially perpendicular to the surface 111 and/or the surface 112. In some embodiments, the lateral surface 113 may be connected to the surface 111 and/or the surface 112.

The surface 111 of the electronic component 11 may face away from the space 10*s*. In some embodiments, the surface 111 of the electronic component 11 may be non-coplanar with the outer surface 101 of the carrier 10. For example, the surface 111 of the electronic component 11 may protrude from the outer surface 101 of the carrier 10. In some embodiments, the surface 111 of the electronic component 11 may be exposed from the carrier 10. In other words, the surface 111 of the electronic component 11 may not be covered by the carrier 10.

The lateral surface 113 of the electronic component 11 may be partially in contact with the carrier 10. For example, the lateral surface 113 of the electronic component 11 may have a portion 113*a* and a portion 113*b* connected with the portion 113*a*. The portion 113*a* of the electronic component 11 may be disposed within the carrier 10 or recess from the outer surface 101 of the carrier 10. The portion 113*a* of the electronic component 11 may directly contact the carrier 10. The portion 113*b* of the electronic component 11 may protrude from the outer surface 101 of the carrier 10. The portion 113*b* of the electronic component 11 may be exposed from the carrier 10. In other words, the portion 113*b* of the electronic component 11 may not be covered by the carrier 10.

However, in some other embodiments, the lateral surface 113 of the electronic component 11 may be fully in contact with the carrier 10. In addition, in some other embodiments, the surface 111 of the electronic component 11 may be substantially coplanar with the outer surface 101 of the carrier 10.

The surface 112 of the electronic component 11 may face the space 10*s*. In some embodiments, a support element 11*c* may be disposed on the surface 112 of the electronic component 11. A part of the electronic component 11 (e.g., the surface 112) and/or the support element 11*c* may be or may constitute a part of a sidewall of the space 10*s*.

In some embodiments, the support element 11*c* may be exposed from the carrier 10. In some embodiments, the support element 11*c* may not be covered by the carrier 10. In some embodiments, a part of the support element 11*c* may be exposed to the space 10*s*. In some embodiments, the support element 11*c* may be fully exposed to the space 10*s*. However, in some other embodiments, the support element 11*c* may be covered or surrounded by the carrier 10. For example, in some other embodiments, the support element 11*c* may be fully embedded within the carrier 10. For example, the support element 11*c* may be disposed between the outer surface 101 and the inner surface 102 of the carrier 10. For example, the support element 11*c* may not be exposed to the space 10*s*.

In some embodiments, the support element 11*c* may include copper (Cu) or other conductive materials, such as aluminum (Al), chromium (Cr), tin (Sn), gold (Au), silver (Ag), nickel (Ni) or stainless steel, another metal, or a mixture, an alloy, or other combinations of two or more thereof. In some embodiments, the support element 11*c* may be or include a conductive layer or a conductive thin film.

In some embodiments, the support element 11*c* may be configured to shield the audio signals in the space 10*s* from interference by other audio signals and/or electrical signals. In some embodiments, by exposing the support element 11*c* to the space 10*s*, the acoustic performance of the wearable component 1 may be improved. For example, the support element 11*c* may facilitate the audio transmission of the space 10*s*.

Similarly, the electronic component 12 may include a surface 121, a surface 122 opposite to the surface 121, and a lateral surface 123 extending between the surface 121 and the surface 122. In some embodiments, the surface 121 may include an active surface and the surface 122 may include a backside surface. A support element similar to the support element 11*c* may be disposed on the surface 122. The electronic component 12 may have the same or similar configuration as the electronic component 11, and the same or similar details of the electronic component 12 are not repeated here for conciseness.

In some embodiments, as shown in FIG. 1B, the electronic component 11 may be physically spaced apart from the electronic component 12. The electronic component 11 and the electronic component 12 may be symmetrically arranged with respect to the space 10*s*. For example, the electronic component 11 and the electronic component 12 may be arranged on opposite sides of the space 10*s*. In some embodiments, the surface 112 of the electronic component 11 and the surface 122 of the electronic component 12 may be substantially parallel to each other.

Figure 2A:
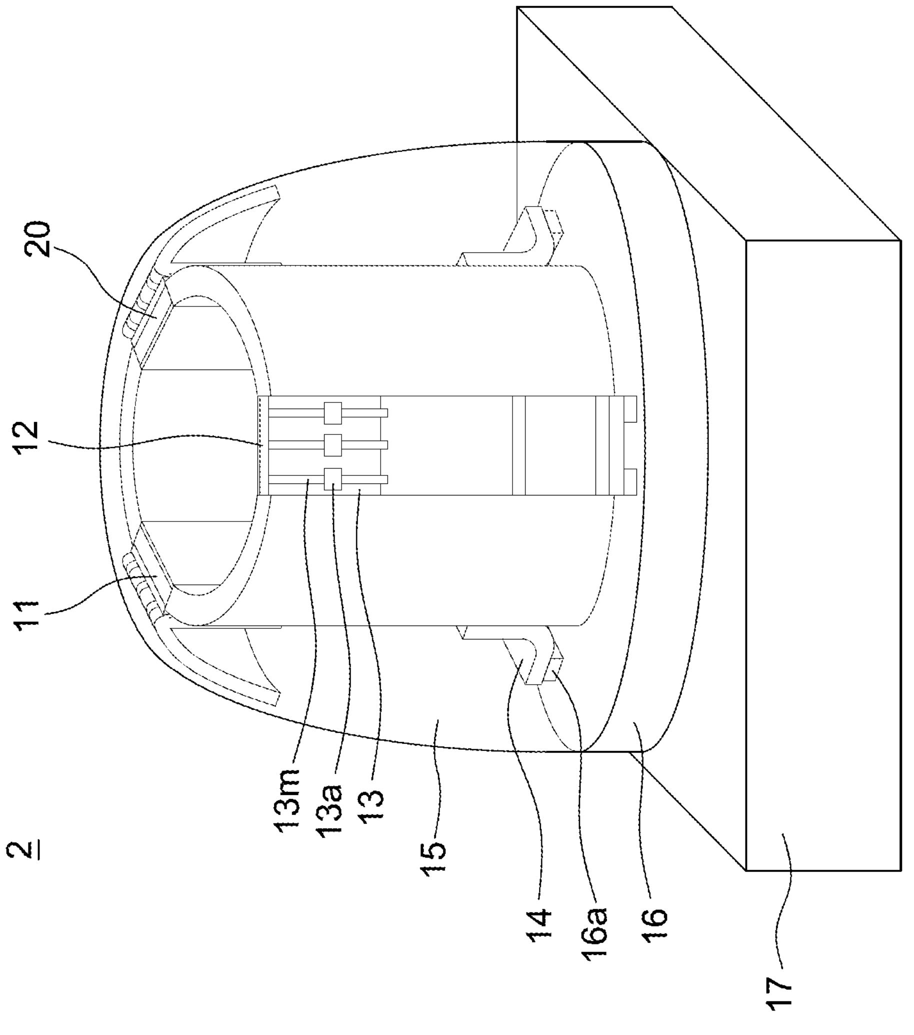
FIG. 2A illustrates a perspective view of a wearable component in accordance with some embodiments of the present disclosure.
Figure 3A:
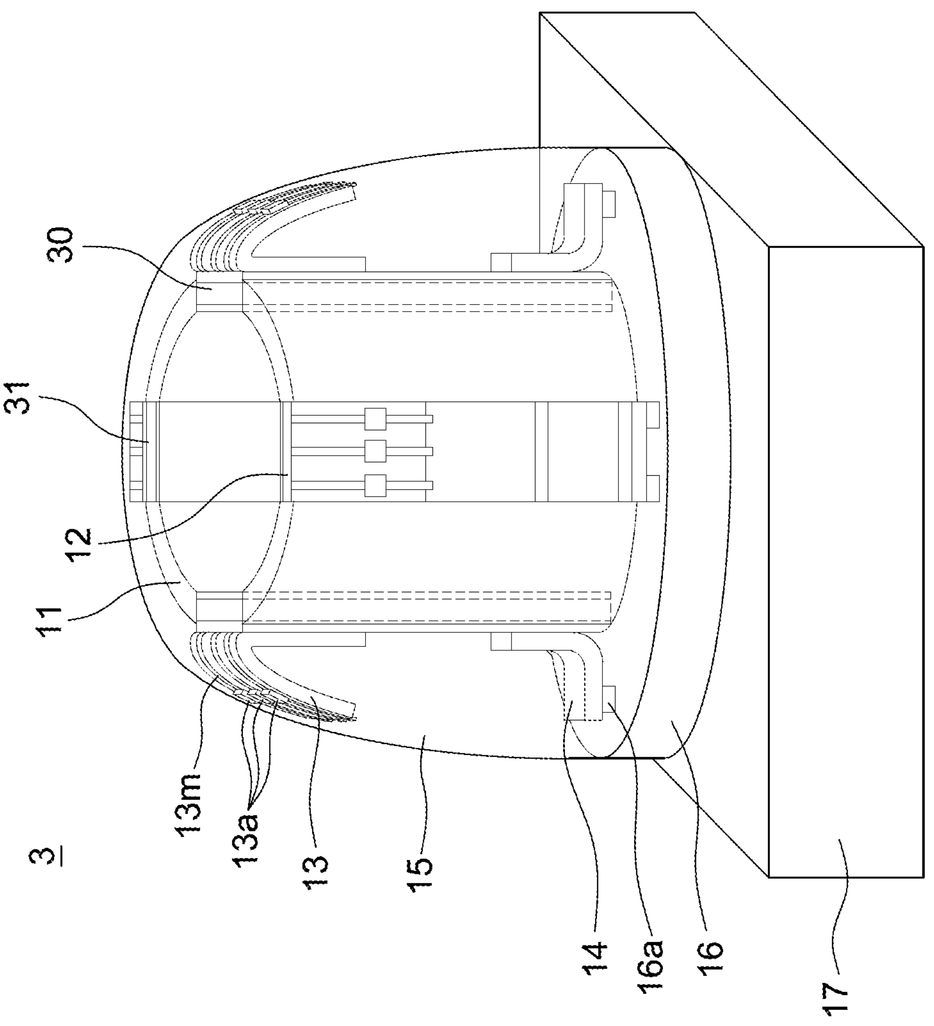
FIG. 3A illustrates a perspective view of a wearable component in accordance with some embodiments of the present disclosure.

The positions, functions, and number of electronic components in the wearable component 1 are not intended to limit the present disclosure. For example, there may be any number of electronic components in the wearable component 1 due to design requirements, as shown in FIG. 2A and FIG. 3A. In some embodiments, the electronic component 12 may be omitted and there may only one electronic component (such as only the electronic component 11) in the wearable component 1.

In some embodiments, the electronic component 11 and the electronic component 12 may each include a system-in-package (SiP). In some embodiments, the electronic component 11 and the electronic component 12 may each include a data conversion component, a processing component, a storage component, a transmission component, or a combination thereof. In some embodiments, the electronic component 11 and the electronic component 12 may each include an analog-to-digital converter. In some embodiments, the electronic component 11 and the electronic component 12 may be insulated from each other. In some embodiments, the electronic component 11 and the electronic component 12 may have different functions.

In some embodiments, one or more electrical contacts 11*a* may be disposed on the surface 111 of the electronic component 11. In some embodiments, the electrical contacts 11*a* may be exposed from the carrier 10. In some embodiments, the electrical contacts 11*a* may not be covered by the carrier 10.

In some embodiments, the electrical contacts 11*a* may include a controlled collapse chip connection (C4) bump, a ball grid array (BGA) or a land grid array (LGA). In some embodiments, an underfill 11*b* may be disposed between the electronic component 11 and the flexible connection element 13 to cover the electrical contacts 11*a*. Similarly, an underfill may be disposed between the electronic component 11 and the flexible connection element 14 (shown in FIG. 1A) to cover the electrical contacts 11*a*.

In some embodiments, the flexible connection element 13 and the flexible connection element 14 may each be electrically connected with the surface 111 of the electronic component 11 through the electrical contacts 11*a*. In some embodiments, the flexible connection element 13 and the flexible connection element 14 may each be exposed from the carrier 10. In some embodiments, the flexible connection element 13 and the flexible connection element 14 may not be covered by the carrier 10.

For example, as shown in FIG. 1B, the flexible connection element 13 may be farther from the location of the space 10*s* than the outer surface 101 of the carrier 10. For example, as shown in FIG. 1B, the flexible connection element 13 may be farther from the location of the space 10*s* than the surface 111 of the electronic component 11.

In some embodiments, the flexible connection element 13 and the flexible connection element 14 may each include an electrical connection element, such as a flexible printed circuit (FPC), a conductive wire, a redistribution layer (RDL), or a combination thereof.

In some embodiments, the flexible connection element 13 may have one or more conductive wires 13*m*. The conductive wires 13*m* may be or include copper wires. In some embodiments, as shown in FIG. 1A, the conductive wires 13*m* may protrude from an end of the flexible connection element 13. In some embodiments, the protruding parts of the conductive wires 13*m* may be surrounded by the carrier 15. In some embodiments, the protruding parts of the conductive wires 13*m* may contact the carrier 15. In some embodiments, the conductive wires 13*m* may be electrically connected with the carrier 15. In some embodiments, the conductive wires 13*m* may increase the electrical conductivity between the flexible connection element 13 and the carrier 15.

In some embodiments, from a cross-sectional view as shown in FIG. 1C, the flexible connection element 13 may extend along the surface 111 of the electronic component 11 and turn over or bend on the top side 10*t*. In some embodiments, the flexible connection element 13 may have a surface facing and contacting the electrical contacts 11*a* on the surface 111 of the electronic component 11. The surface may turn over or bend on the top side 10*t* and may be referred to as a reverse surface 10*r*.

The sensing elements 13*a* may be disposed on the reverse surface 10*r*. In some embodiments, the sensing elements 13*a* may each be electrically connected with the electronic component 11 through the flexible connection element 13.

In some embodiments, the sensing elements 13*a* may each be an electrode, a thermistor, a pressure sensor, a proximity sensor, a motion sensor, an acoustic sensor, a smell sensor, a particle sensor, a humidity sensor, an optical transmitter, an optical receiver, an optical transceiver, or a combination thereof.

In some embodiments, the sensing elements 13*a* may each be used to detect or collect one or more signals or pieces of information external to the wearable component 1. For example, the sensing elements 13*a* may each be used to detect one or more signals from the surroundings of the wearable component 1. For example, the sensing elements 13*a* may each be used to detect temperature, air pressure, smell, particle, sound, light, humidity, or other environmental variables. For example, the sensing elements 13*a* may each be used to detect one or more signals associated with the user of the wearable component 1. For example, the sensing elements 13*a* may each be used to detect one or more biosignals of the user. For example, the biosignals detected by the sensing element 11 may be further processed by the electronic component 11 to determine a biological parameter of the user, such as a pulse travel time (PTT), an electroencephalogram (EEG), electrocardiogram (ECG), electromyogram (EMG), electrooculogram (EOG), galvanic skin response (GSR), sweat composition, pH, heart rate variability (HRV), or other biologically-relevant information associated with the user.

The positions, functions, and number of sensing elements in the wearable component 1 are not intended to limit the present disclosure. For example, there may be any number of sensing elements in the wearable component 1 due to design requirements.

In some embodiments, the carrier 15 may be connected with the carrier 10. In some embodiments, the carrier 15 may cover or contact the carrier 10. In some embodiments, the carrier 15 may cover or contact the exposed portions of the electronic components 11 and 12. For example, the carrier 15 may cover or contact a part of the surface 111 of the electronic component 11 and/or the surface 121 of the electronic component 12. In some embodiments, the carrier 15 may cover or contact the exposed portions of the flexible connection elements 13 and 14. In some embodiments, the carrier 15 may cover or contact the sensing elements 13*a*. In some embodiments, the carrier 15 may be configured to protect the sensing elements 13*a*. For example, the sensing elements 13*a* may be at least partially surrounded, embedded, or covered by the carrier 15.

In some embodiments, the carrier 15 may be conductive. In some embodiments, the carrier 15 may include conductive materials, such as conductive silicone rubber. In some embodiments, the carrier 15 may have a relatively low impedance, such as an ultra-low impedance.

In some embodiments, the carrier 15 may include, for example, rubber, silicon, sponge, or other suitable materials such as an elastic material, a soft material, or a flexible material. In some embodiments, the carrier 15 may include a liquid silicone rubber (LSR).

In some embodiments, the carrier 15 may be configured to be adjustable. The carrier 15 may be soft and flexible enough for the user to wear comfortably for an extended time period. In some embodiments, the carrier 15 may be relatively more resistant to stress, impact, twisting or other physical or structural changes. For example, the carrier 15 may be resilient, such that, after being squeezed or deformed, it can return to its original state. In some embodiments, when the wearable component 1 is worn, the carrier 15 may be conformal to the user's ear canal. In some embodiments, the carrier 15 may flexibly adjust its shape to conform to the user's ear canal. In some embodiments, the carrier 15 may flexibly adjust its shape to conform to other body parts of the user.

In some embodiments, the carrier 15 may have a characteristic or property different from the carrier 10. For example, the carrier 15 may be softer than the carrier 10. The elasticity of the carrier 15 may be higher than that of the carrier 10. For example, the carrier 10 may be harder than the carrier 15. The hardness of the carrier 10 may be higher than that of the carrier 15.

In some embodiments, the electronic component 11 may be configured to receive a signal through the flexible connection element 13 from the sensing element 13*a*. In some embodiments, the signal transmission or a signal path between the sensing element 13*a* and the electronic component 11 may be within the carrier 15. For example, the signal transmission or a signal path between the sensing element 13*a* and the electronic component 11 may be surrounded by the carrier 15.

In some embodiments, the biosignals from the sensing element 13*a* may be converted to digital signals (such as by the electronic component 11) within the carrier 15. In some embodiments, the biosignals from the sensing element 13*a* may be amplified (such as by the electronic component 11) within the carrier 15. In some embodiments, the biosignals from the sensing element 13*a* may be stored (such as by the electronic component 11) within the carrier 15. In some embodiments, the biosignals detected by the sensing element 13*a* can be processed (e.g., converted to a digital signal, amplified, stored, etc.) within the carrier 15. Therefore, the signal noise can be reduced, and the wearable component 1 can provide high dynamic range signal digitization. In addition, the overall circuit in the wearable component 1 can consume less power and occupy a smaller area.

Furthermore, in some embodiments, incorporating the electronic component 11 into the carrier 10 can facilitate miniaturization of the wearable component 1. Since the electronic component 11 is not disposed in the carrier 15, when the carrier 15 is squeezed or deformed, the electronic component 11 will not protrude and adversely affect a user's experience.

In addition, in some embodiments, since the flexible connection element 13 is exposed from the outer surface 101 of the carrier 10, the flexible connection element 13 may be removable from the electronic component 11 without damaging the carrier 10 or the electronic component 11. For example, the carrier 15 may be removed to expose the flexible connection element 13. Then, the electrical contacts 11*a* between the flexible connection element 13 and the surface 111 of the electronic component 11 may be removed through heating. The electronic component 11 and the carrier 10 can remained unchanged. Therefore, the flexible connection element 13 can be more easily maintained.

In some embodiments, the electronic component 11 may transmit the processed signal or the signal to an external device (such as the connector 16 and the electronic device 17). For example, the electronic component 11 may be electrically connected with the connector 16 and the electronic device 17 through the flexible connection element 14. The flexible connection element 14 may extend along the surface 111 of the electronic component 11 and turn over or bend on the bottom side 10*m*. The flexible connection element 14 may be electrically connected with the connector 16 through a conductive pad 16*a* on the connector 16. In some other embodiments, the flexible connection element 14 may provide electrical connections between the wearable component 1 and other external components (e.g., external circuits or circuit boards). In some other embodiments, the electronic component 11 may be connected to the connector 16 by using another alternative method(s) or component(s). For example, the electronic component 11 may be connected to the connector 16 by using any bridging element.

Figure 1D:
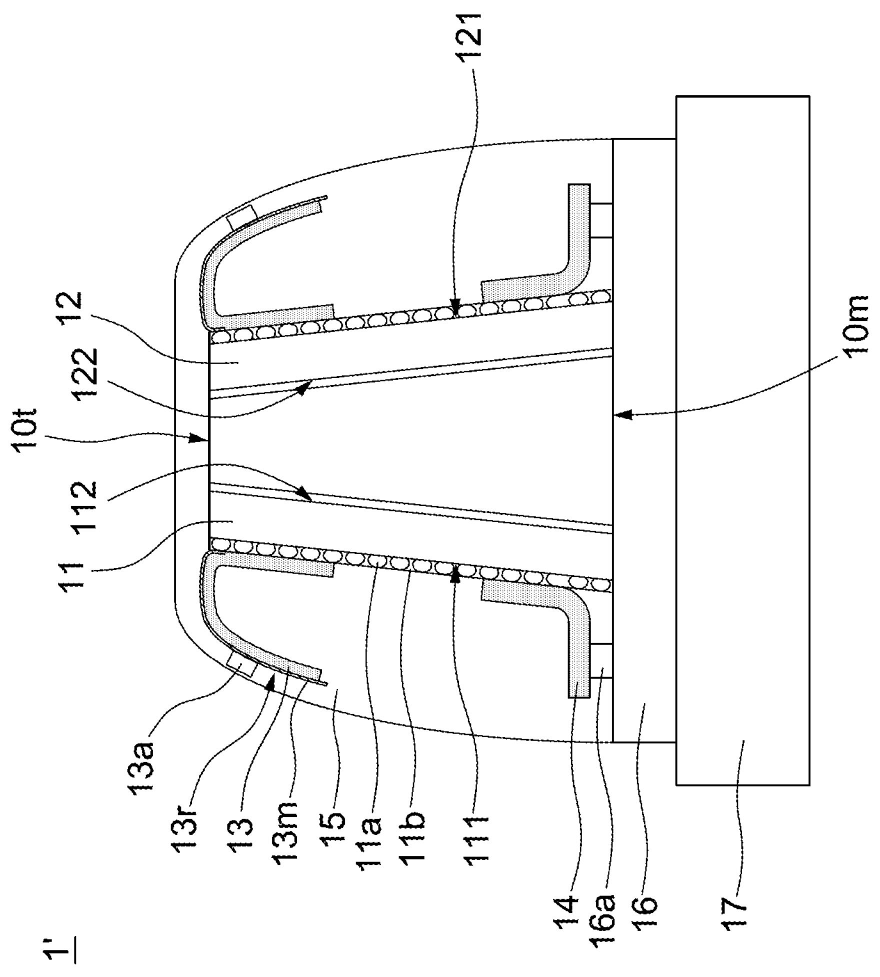
FIG. 1D illustrates a cross-sectional view of a wearable component in accordance with some embodiments of the present disclosure.

FIG. 1D illustrates a cross-sectional view of a wearable component 1' in accordance with some embodiments of the present disclosure. The wearable component 1' is similar to the wearable component 1 in FIG. 1C except for the differences described as follows.

The electronic components 11 and 12 of the wearable component 1 in FIG. 1C are substantially parallel to each other. In some embodiments, the surface 112 of the electronic component 11 and the surface 122 of the electronic component 12 in FIG. 1C may be substantially parallel to each other.

In FIG. 1D, the electronic components 11 and 12 of the wearable component 1' are not parallel to each other. For example, the electronic components 11 and 12 of the wearable component 1' may define an angle with each other. For example, the space 10*s* of the wearable component 1' may be tapered from the bottom side 10*m* toward the top side 10*t*. In some embodiments, the arrangement of the electronic components 11 and 12 of the wearable component 1' may better conform to a user's ear canal and be more comfortable for the user.

Figure 2B:
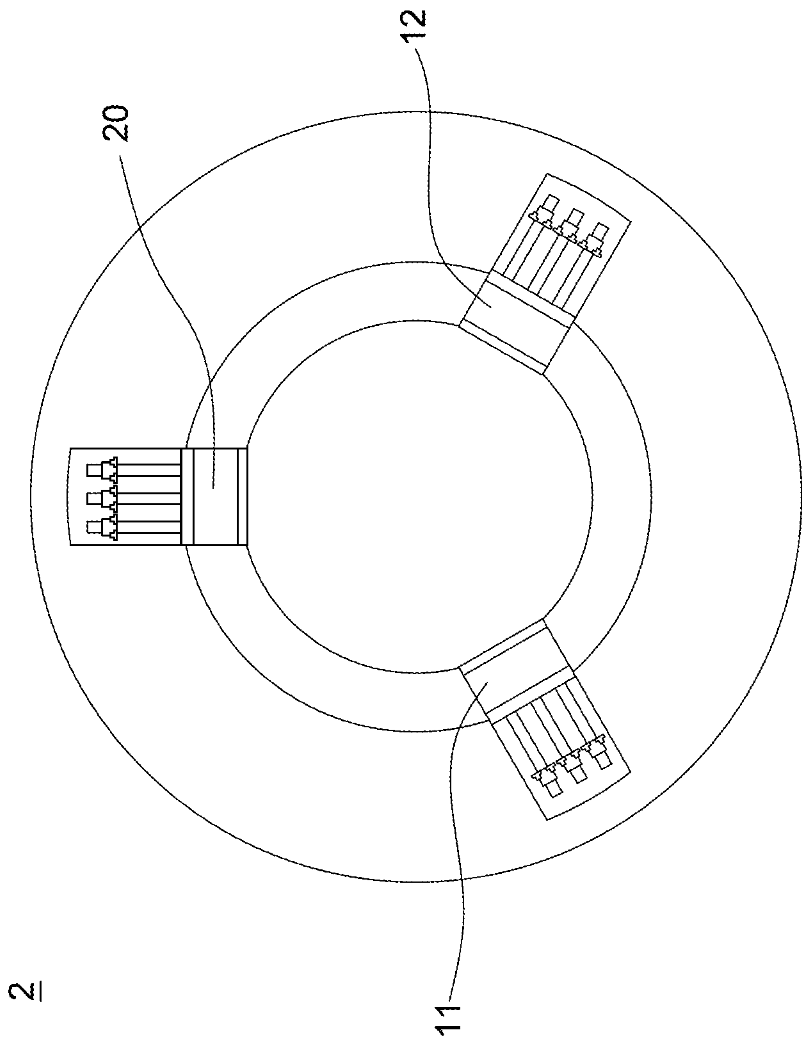
FIG. 2B illustrates a top view of a wearable component in accordance with some embodiments of the present disclosure.
Figure 2C:
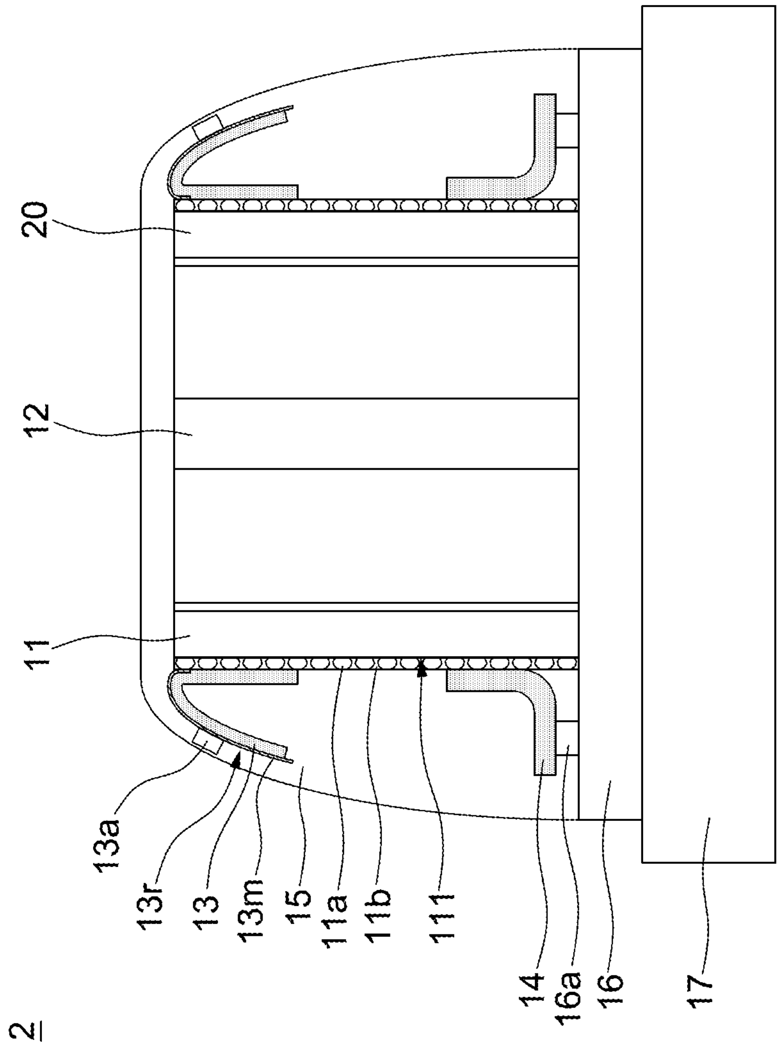
FIG. 2C illustrates a cross-sectional view of a wearable component in accordance with some embodiments of the present disclosure.

FIG. 2A illustrates a perspective view of a wearable component 2 in accordance with some embodiments of the present disclosure. FIG. 2B and FIG. 2C illustrate a top view and a cross-sectional view, respectively, of the wearable component 2 in accordance with some embodiments of the present disclosure. The wearable component 2 is similar to the wearable component 1 in FIG. 1A, FIG. 1B, and FIG. 1C except for the differences described as follows.

The wearable component 2 in FIG. 2A, FIG. 2B, and FIG. 2C further includes an electronic component 20. In some embodiments, as shown in FIG. 2B, the electronic component 11, the electronic component 12, and the electronic component 20 may be physically spaced apart from one another. In some embodiments, the electronic component 11, the electronic component 12, and the electronic component 20 may be spaced apart from one another by an equivalent distance.

Figure 3B:
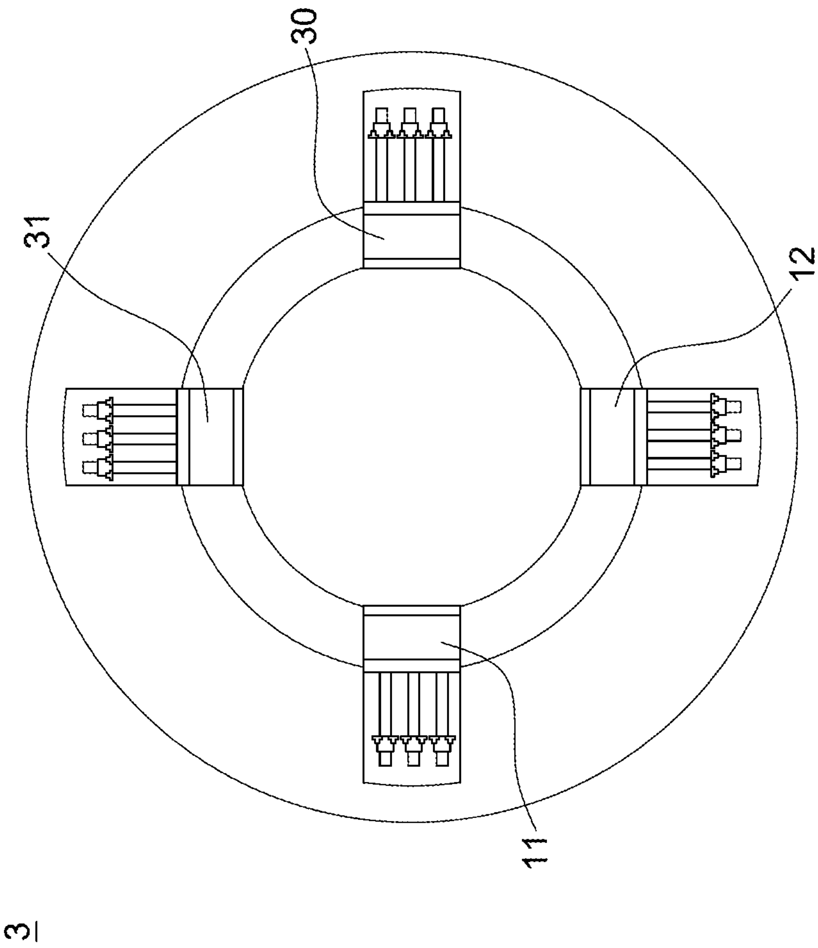
FIG. 3B illustrates a top view of a wearable component in accordance with some embodiments of the present disclosure.
Figure 3C:
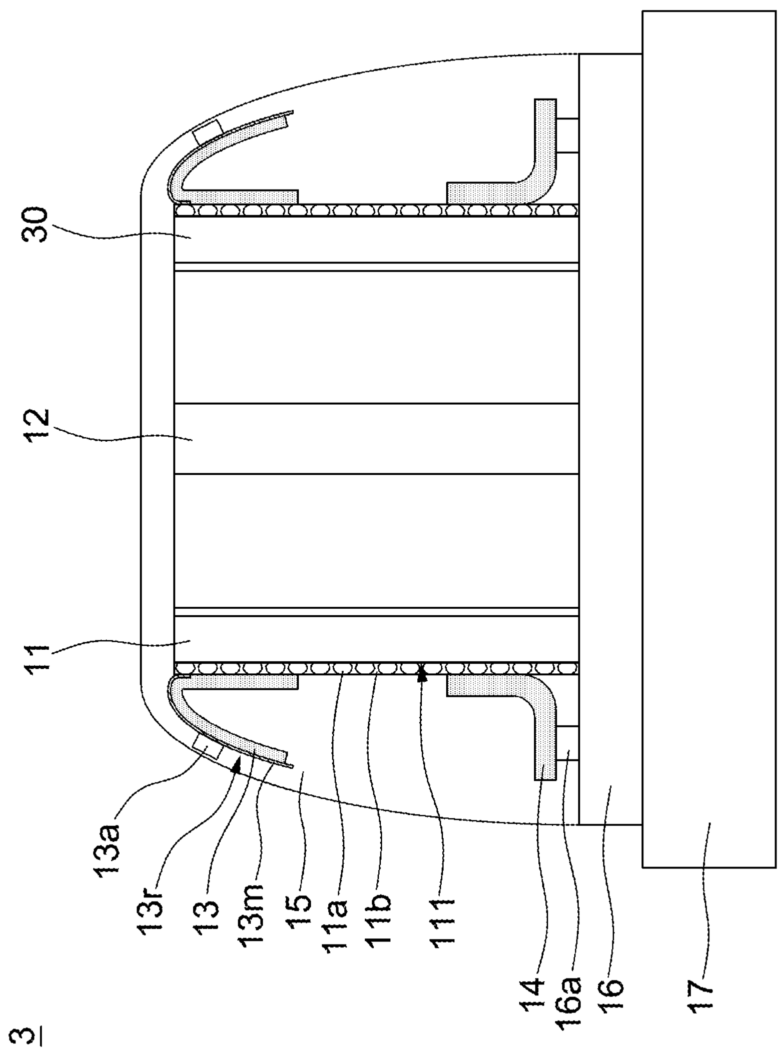
FIG. 3C illustrates a cross-sectional view of a wearable component in accordance with some embodiments of the present disclosure.

FIG. 3A illustrates a perspective view of a wearable component 3 in accordance with some embodiments of the present disclosure. FIG. 3B and FIG. 3C illustrate a top view and a cross-sectional view, respectively, of the wearable component 3 in accordance with some embodiments of the present disclosure. The wearable component 3 is similar to the wearable component 1 in FIG. 1A, FIG. 1B, and FIG. 1C except for the differences described as follows.

The wearable component 3 in FIG. 3A, FIG. 3B, and FIG. 3C further includes electronic components 30 and 31. In some embodiments, as shown in FIG. 3B, the electronic component 11, the electronic component 12, the electronic component 30, and the electronic component 31 may be physically spaced apart from one another. In some embodiments, the electronic component 11, the electronic component 12, the electronic component 30, and the electronic component 31 may be spaced apart from one another by an equivalent distance.

FIG. 4A, FIG. 4B, FIG. 4C, FIG. 4D, FIG. 4E, FIG. 4F, FIG. 4G, and FIG. 4H illustrate cross-sectional views in one or more stages of a method of manufacturing a wearable component in accordance with an embodiment of the present disclosure. At least some of these figures have been simplified to better understand the aspects of the present disclosure. In some embodiments, the wearable component 1, the wearable component 2 and/or the wearable component 3 may be manufactured through the operations described with respect to FIG. 4A, FIG. 4B, FIG. 4C, FIG. 4D, FIG. 4E, FIG. 4F, FIG. 4G, and FIG. 4H.

Figure 4A:
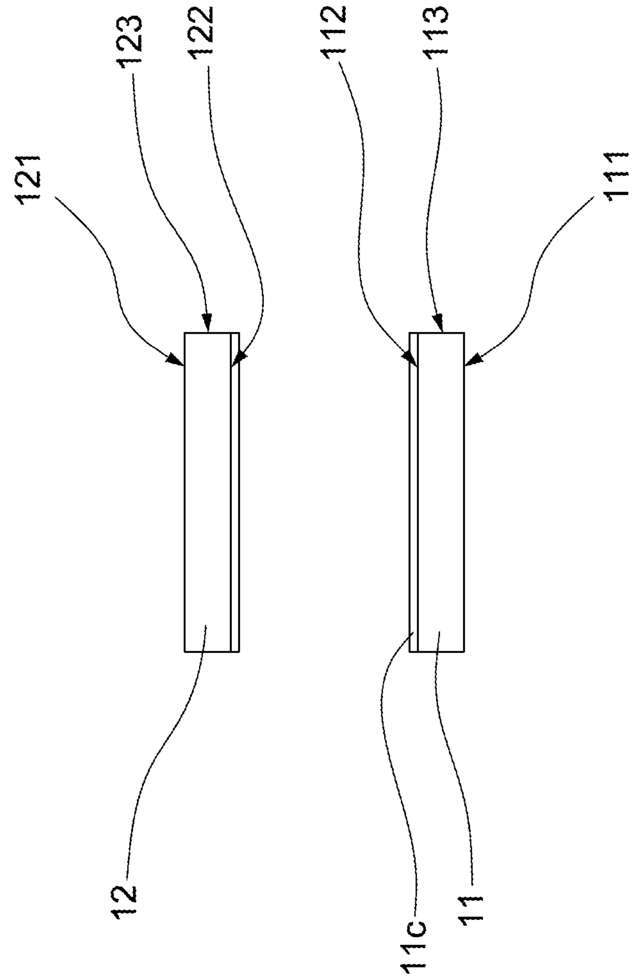
FIG. 4A, FIG. 4B, FIG. 4C, FIG. 4D, FIG. 4E, FIG. 4F, FIG. 4G, and FIG. 4H illustrate cross-sectional views in one or more stages of a method of manufacturing a wearable component in accordance with an embodiment of the present disclosure.

Referring to FIG. 4A, the electronic components 11 and 12 may be provided. The electronic component 11 may include the surface 111, the surface 112 opposite to the surface 111, and the lateral surface 113 extending between the surface 111 and the surface 112. The electronic component 12 may include the surface 121, the surface 122 opposite to the surface 121, and the lateral surface 123 extending between the surface 121 and the surface 122. Support elements 11*c* may be disposed on the surface 112 of the electronic component 11 and the surface 122 of the electronic component 12.

Figure 4B:
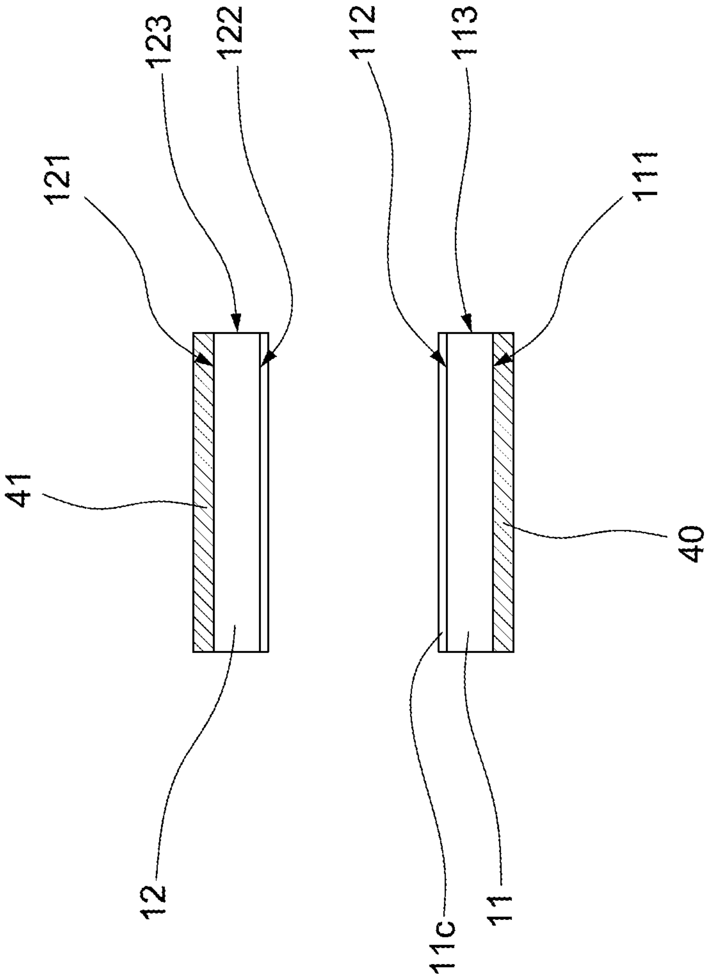

Referring to FIG. 4B, a protection structure 40 may be disposed on the surface 111 of the electronic component 11. A protection structure 41 may be disposed on the surface 121 of the electronic component 12.

Figure 4C:
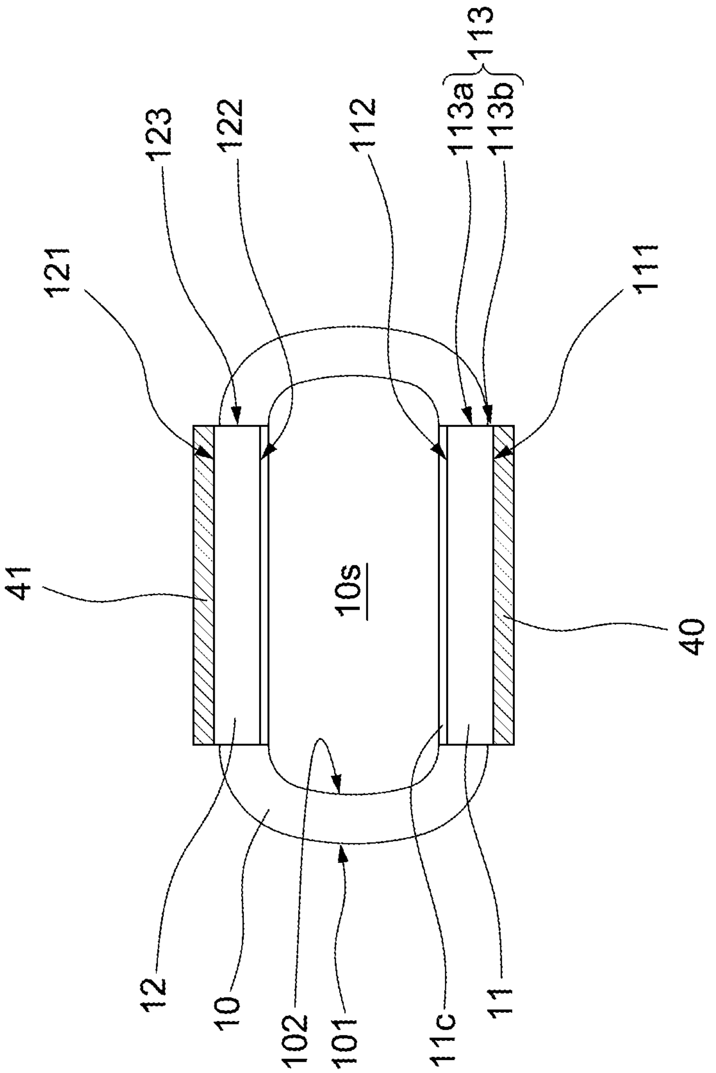

Referring to FIG. 4C, the carrier 10 may be formed by a molding technique, such as injection molding. In some embodiments, the electronic components 11 and 12 may be fixed or positioned by a mold such that the surface 111 of the electronic component 11 and the surface 121 of the electronic component 12 are substantially parallel to each other. In some embodiments, the electronic components 11 and 12 may be fixed or positioned by a mold such that the surface 111 of the electronic component 11 and the surface 121 of the electronic component 12 are protruded from the outer surface 101 of the carrier 10. In some embodiments, the electronic components 11 and 12 may be fixed or positioned by a mold such that the surface 111 of the electronic component 11 and the surface 121 of the electronic component 12 are not covered by the carrier 10 to avoid overflow issues in the following operations (such as the operation in FIGS. 4E and 4F). After the operation in FIG. 4C, the space 10*s* may be defined by the carrier 10, the electronic component 11 and the electronic component 12.

Figure 4D:
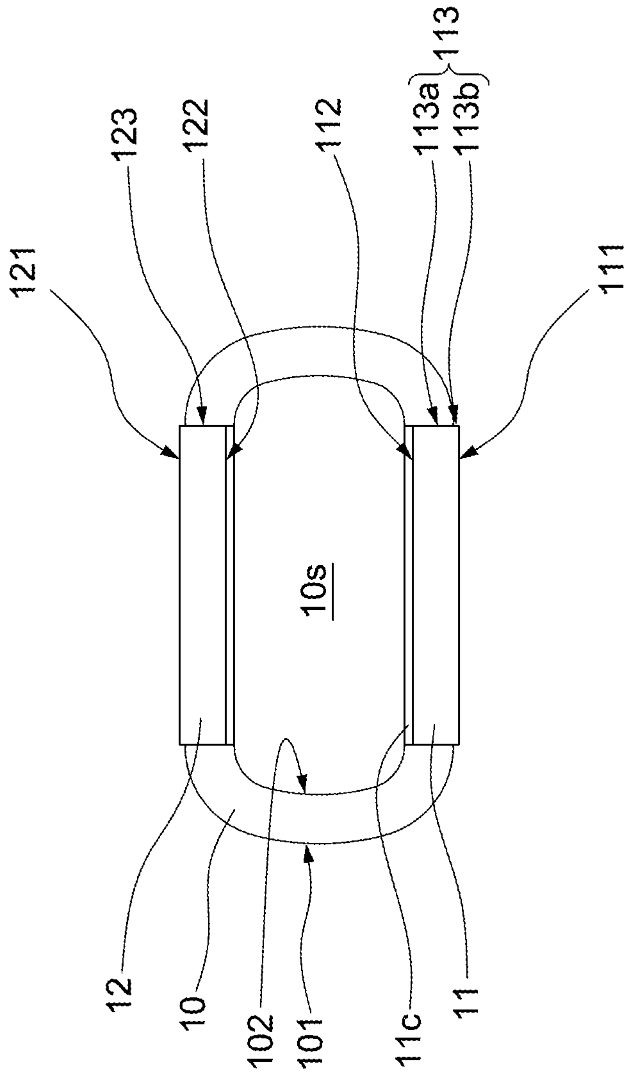

Referring to FIG. 4D, the protection structure 40 may be removed from the surface 111 of the electronic component 11. The protection structure 41 may be removed from the surface 121 of the electronic component 12. After the operation in FIG. 4D, the surface 111 of the electronic component 11 and the surface 121 of the electronic component 12 may be exposed.

Figure 4E:
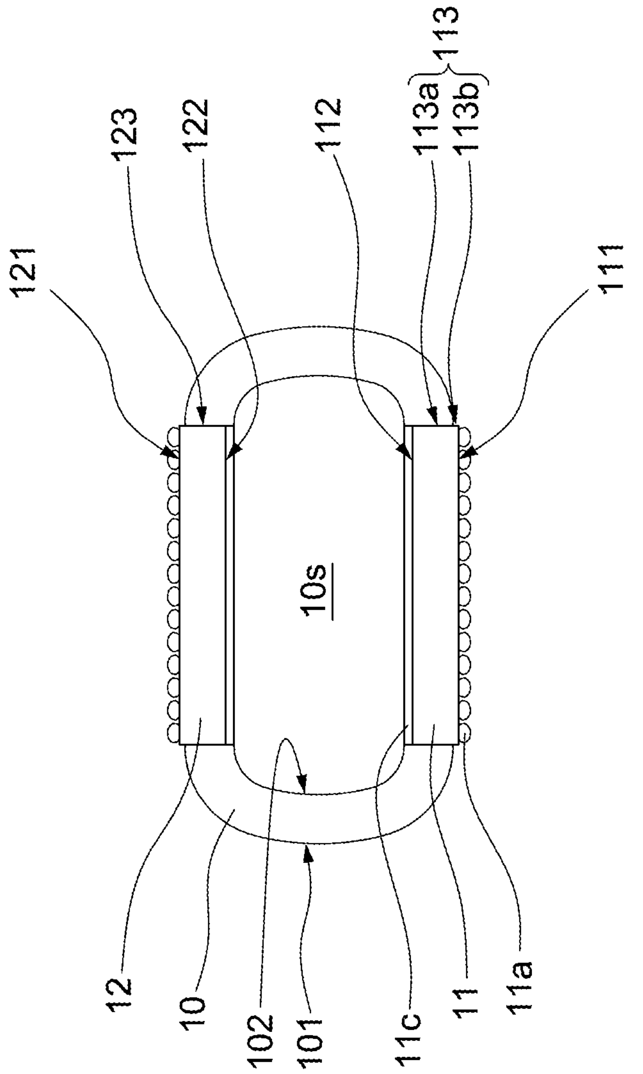

Referring to FIG. 4E, one or more electrical contacts 11*a* may be disposed on the surface 111 of the electronic component 11. Similarly, one or more electrodes may be disposed on the surface 121 of the electronic component 12.

Figure 4F:
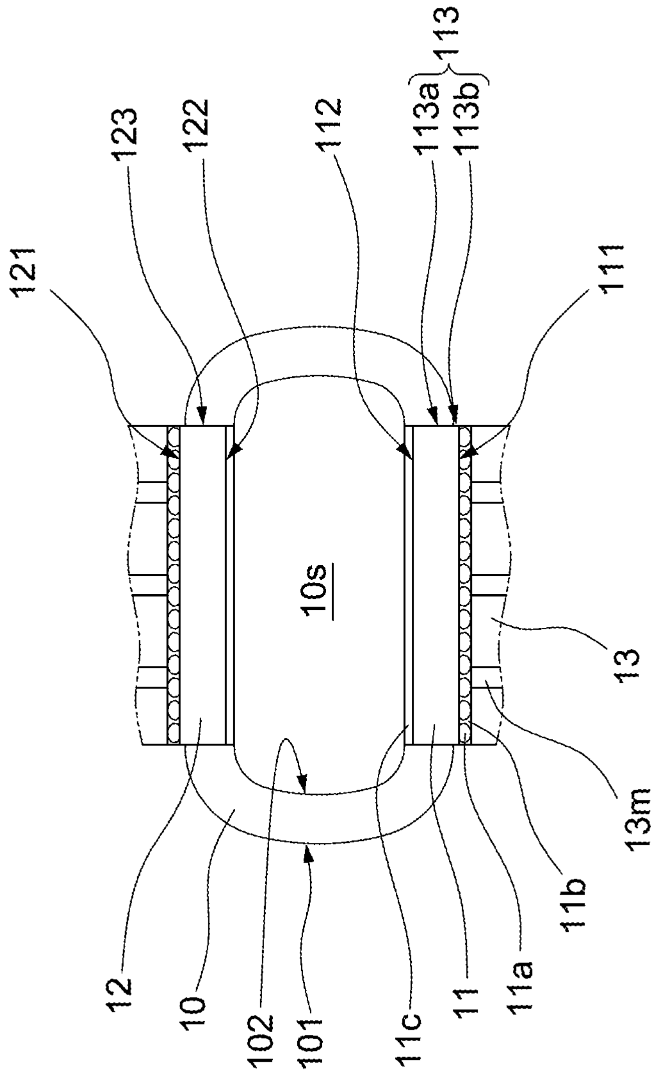

Referring to FIG. 4F, the flexible connection element 13 may be electrically connected with the surface 111 of the electronic component 11 through the electrical contacts 11*a*. Similarly, a flexible connection element may be electrically connected with the surface 121 of the electronic component 12 through the electrodes on the surface 121. In some embodiments, the flexible connection element 13 may be attached to the surface 111 of the electronic component 11 through a low temperature soldering process. In some embodiments, the flexible connection element 13 may be attached to the surface 111 of the electronic component 11 after the electronic component 11 and the carrier 10 are formed.

Figure 4G:
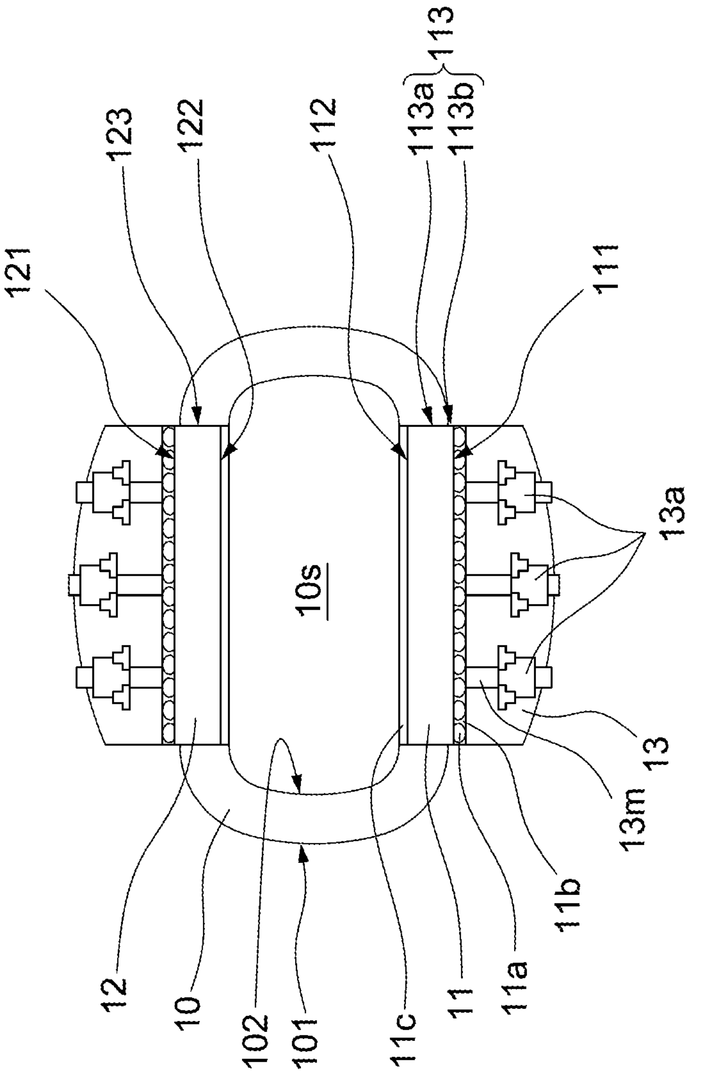

Referring to FIG. 4G, the sensing element 13*a* may be disposed on the flexible connection element 13. The sensing element 13*a* may be electrically connected to one or more other sensing elements (if any) and to the flexible connection element 13 (e.g., to the conductive wires 13*m*), and the electrical connection may be attained by way of flip-chip, wire-bond techniques, metal to metal bonding (such as Cu to Cu bonding), or hybrid bonding.

Figure 4H:
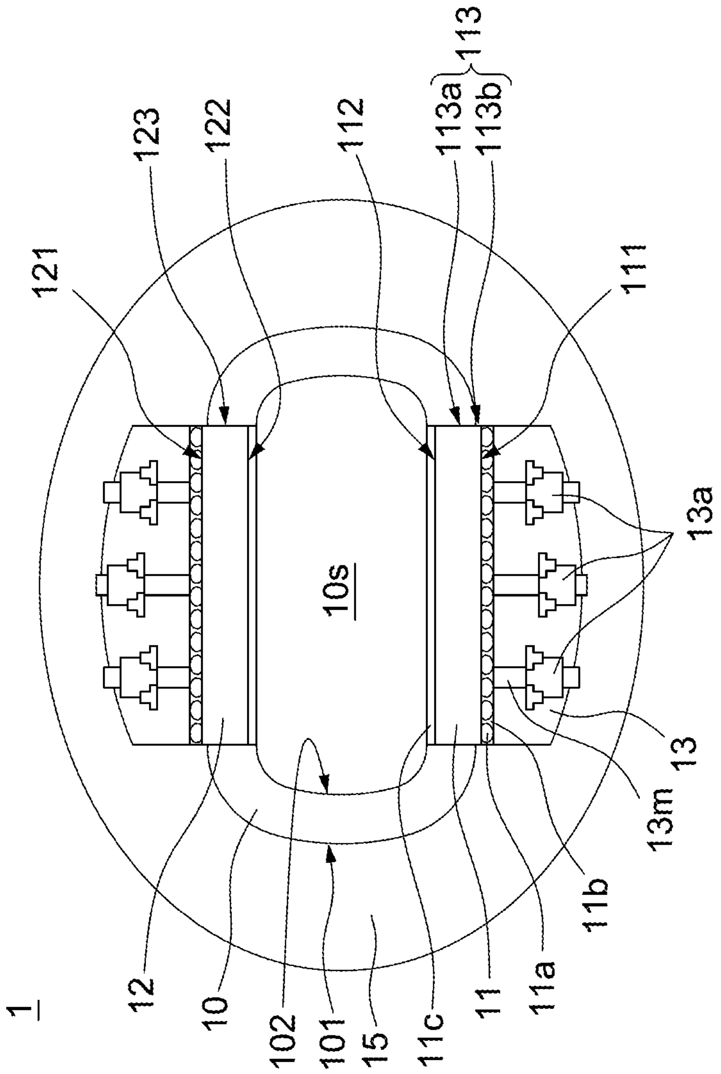

Referring to FIG. 4H, the carrier 15 may be formed to encapsulate the structure obtained from FIG. 4G. In some embodiments, the carrier 15 may be formed by a molding technique, such as transfer molding or compression molding.

In some embodiments, since the flexible connection element 13 is exposed from the outer surface 101 of the carrier 10, the flexible connection element 13 may be removable from the electronic component 11 without damaging the carrier 10 or the electronic component 11. For example, the carrier 15 may be removed to expose the flexible connection element 13. Then, the electrical contacts 11*a* between the flexible connection element 13 and the surface 111 of the electronic component 11 may be removed through heating. The electronic component 11 and the carrier 10 can remained unchanged. Therefore, the flexible connection element 13 can be more easily maintained.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 10+S/m, such as at least 105 S/m or at least 106 S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to #10°, such as less than or equal to ±5°, less than or equal to ±4°, less than or equal to +3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A wearable component, comprising:

a first carrier; and an electronic component at least partially embedded within the first carrier, wherein the first carrier and the electronic component define a space configured for audio transmission, wherein the first carrier contacts the electronic component, wherein the electronic component is disposed outside of the space, wherein the electronic component has an active surface at least partially exposed from an outer surface of the first carrier; and a flexible connection element connected to the active surface of the electronic component.

2. An ear tip, comprising:

a first carrier;

an electronic component at least partially embedded within the first carrier; and an electrical connection element exposed from the first carrier and configured to be removable with respect to the electronic component through removing at least one electrical contact.

3. A method of manufacturing a wearable component, comprising:

(a) providing an electronic component; and (b) forming a first carrier at least partially covering the electronic component, and exposing an active surface of the electronic component and a backside surface of the electronic component, wherein the backside surface of the electronic component and an inner surface of the first carrier define a space configured for audio transmission, and wherein the active surface of the electronic component is disposed outside of the space.

4. The wearable component of claim 1, wherein the first carrier contacts a non-circuit region of the electronic component.

5. The wearable component of claim 1, wherein the electronic component has six sides including a first side, a second side opposite to the first side, and a third side connecting the first side and the second side, the third side facing the space, wherein the carrier contacts the first side or the second side.

6. The wearable component of claim 1, wherein the electronic component penetrates the first carrier, wherein the first carrier has an inner surface exposed to the space and an outer surface opposite to the inner surface, and wherein the electronic component extends between the inner surface and the outer surface of the first carrier.

7. The wearable component of claim 1, wherein the electronic component has a backside surface opposite to the active surface, and the wearable component further comprising:

a shielding element disposed over the backside surface of the electronic component and between the electronic component and the space.

8. The wearable component of claim 7, wherein the shielding element is configured to shield audio signals in the space from interference by other audio signals and/or electrical signals.

9. The wearable component of claim 1, further comprising:

a plurality of electrical contacts connected to the active surface of the electronic component.

10. The wearable component of claim 1, further comprising:

a second carrier contacting the flexible connection element and the first carrier.

11. The ear tip of claim 2, wherein the at least one electrical contact includes a soldering material.

12. The ear tip of claim 11, further comprising:

an underfill disposed between the electronic component and the electrical connection element and covering the at least one electrical contact.

13. The ear tip of claim 2, wherein the electrical connection element includes a flexible printed circuit and is electrically connected to the electronic component through the at least one electrical contact.

14. The ear tip of claim 2, wherein a portion of the electronic component protrudes from an outer surface of the first carrier.

15. The ear tip of claim 14, wherein the at least one electrical contact is connected to the portion of the electronic component.

16. The ear tip of claim 2, wherein one of the at least one electrical contact is not connected to the electrical connection element.

17. The ear tip of claim 16, further comprising:

a second carrier encapsulating the electrical connection element and covering the one of the at least one electrical contact.

18. The method of claim 3, further comprising:

connecting a flexible printed circuit (FPC) to the electronic component through a soldering process.

19. The method of claim 18, further comprising:

connecting a sensing element to the FPC; and forming a second carrier encapsulating the electronic component and the FPC, and at least partially covering the sensing element.

* * * * *